March 11, 1958
H. E. BALLARD
2,826,467
PRESSURE CYLINDER
Filed May 21, 1956
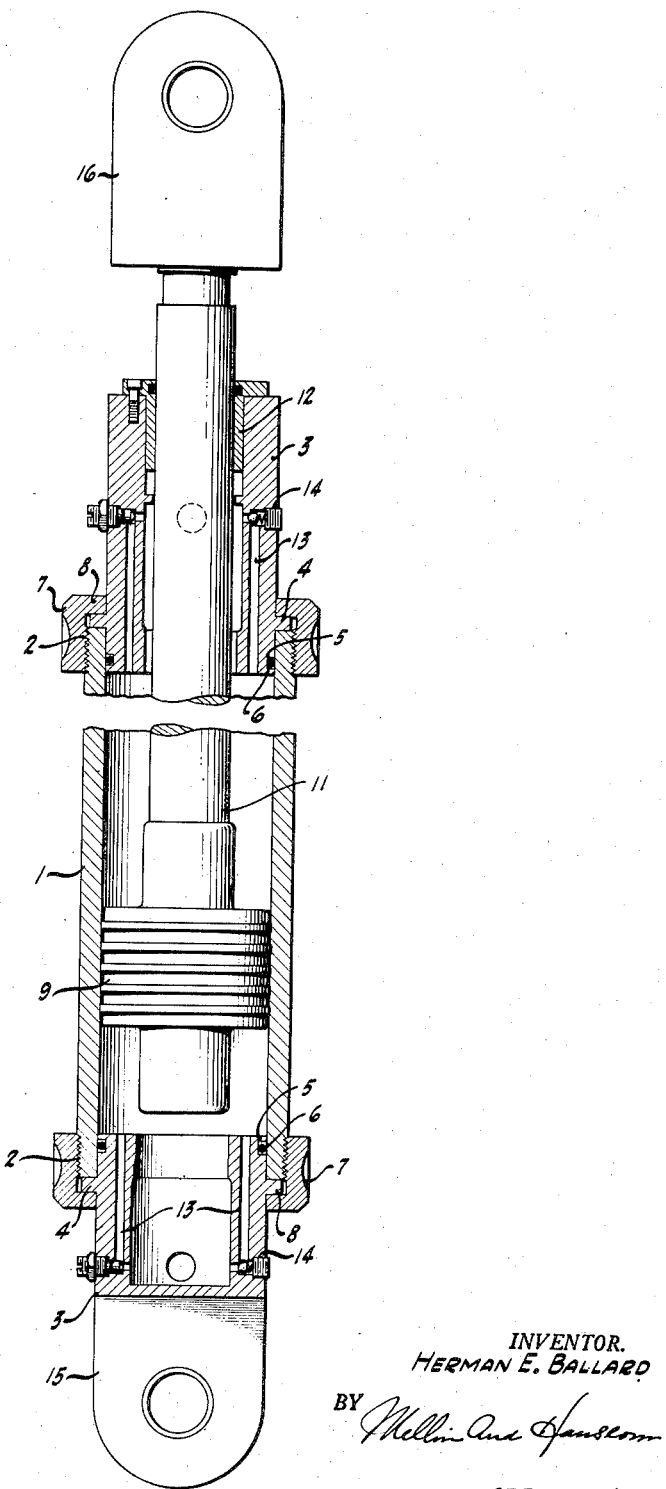
INVENTOR.
HERMAN E. BALLARD
BY
ATTORNEYS

United States Patent Office 2,826,467
Patented Mar. 11, 1958

2,826,467

PRESSURE CYLINDER

Herman E. Ballard, Berkeley, Calif., assignor to Elco Manufacturing Company, Berkeley, Calif., a corporation of California Application May 21, 1956, Serial No. 586,288

1 Claim. (Cl. 309—2)

This invention relates to and in general has for its object the provision of a pressure cylinder, and more particularly, to a new and improved structure for affixing the head thereof to the cylinder proper.

More specifically, the object of this invention is the provision of a hydraulic actuator including a cylinder; a cylinder head partially extending into one end of said cylinder and having a close tolerance therewith; and an annular cap circumscribing said head and threaded thereto, said cap being provided with an annular shoulder or flange arranged to seat against an external annular flange formed on said cylinder head and to force said latter flange against the adjacent end of said cylinder.

The invention possesses other advantageous features, some of which, with the foregoing, will be set forth at length in the following description where that form of the invention which has been selected for illustration in the drawing accompanying and forming a part of the present specification, is outlined in full. In said drawing, one form of the invention is shown, but it is to be understood that it is not limited to such form, since the invention as set forth in the claim may be embodied in other forms.

In the accompanying drawing, the single figure shown therein is a longitudinal mid-section of a hydraulic actuator of a cylinder embodying the objects of my invention.

The embodiment of my invention as illustrated in this figure comprises an internally machined hydraulic cylinder 1 provided at each of its ends with threads 2. Partially extending into each end of the cylinder 1, with a close tolerance, is an externally machined cylindrical cylinder head 3 provided intermediate its ends with an external annular flange 4 arranged to abut or seat against the adjacent end of the cylinder 1, the external diameter of the flange 4 being slightly less than the minor diameter of the threads 2. Also formed in each cylinder head 3, adjacent its inner end, is an external annular channel or stuffing box 5 for housing an O seal ring 6. Circumscribing each cylinder head 3 and threaded to the adjacent end of the cylinder 1 is an annular nut or cap 7 formed at its outer end with an internal annular shoulder or flange 8 having a close tolerance with its associated cylinder head and arranged to abut or seat against the outer face of the contiguous cylinder head flange 4.

As a result of this construction, the cylinder heads can be held in sealed engagement with the cylinder 1 with any force required, for the threads 2 may be made as long as desired and the mating flanges 4 and 8 can be made as thick as required. This structure obviates the use of tie rods, and therefore conserves space, and any elongation of the structure in response to stresses imposed thereon is taken up by the cylinder. Furthermore, the angular relationship between the cylinder heads can be readily adjusted by simply unscrewing one or both of the caps 7, rotating the cylinder heads through the desired angle, and then tightening the caps.

Slidably mounted within the cylinder 1 is a conventional piston 9 mounted on a piston rod 11 extending through a bushing 12 associated with one of the cylinder heads 3, and formed in each of the cylinder heads are valved passageways 13 and ports 14. Although constituting no part of the present invention, it may be noted that the lower end of the cylinder heads 3 is provided with a coupling member 15, and that a similar coupling member 16 is provided on the upper free end of the piston rod 11, all in accordance with customary practice.

I claim:

A hydraulic actuator comprising: an internally machined actuator cylinder having an externally threaded end; an externally machined cylindrical cylinder head extending partially into the externally threaded end of said actuator cylinder with a close tolerance and formed at its inner end with an external annular stuffing box, said cylinder head being provided intermediate its ends with an external annular flange having an outer diameter less than the minor diameter of the threads of said actuator cylinder and arranged to abut the threaded end of said cylinder; and an annular internally threaded cap circumscribing said cylinder head and threaded to the end of said cylinder, said cap being provided with an annular flange arranged to seat against said cylinder head flange, and said cylinder head being formed with a fluid port outwardly of said cap.

References Cited in the file of this patent

UNITED STATES PATENTS

| | | |
|---|---|---|
| 2,340,817 | Martin-Hurst | Feb. 1, 1944 |
| 2,690,939 | Whaley | Oct. 5, 1954 |